March 21, 1933.  C. E. DEITSCH  1,902,765

SAFETY CUT-OUT SWITCH

Filed Dec. 13, 1929

INVENTOR.
Carl E. Deitsch,
BY
Geo. P. Kimmel
ATTORNEY.

Patented Mar. 21, 1933

1,902,765

UNITED STATES PATENT OFFICE

CARL E. DEITSCH, OF MARION, OHIO

SAFETY CUT-OUT SWITCH

Application filed December 13, 1929. Serial No. 413,895.

This invention relates to a safety cutout switch designed primarily for use in connection with the electrical wiring systems of motor vehicles, but it is to be understood that a cutout switch in accordance with this invention may be employed in any connection for which it may be found applicable, and the invention has for its object to provide, in a manner as hereinafter set forth, a cutout switch which will conveniently enable the driver of a motor vehicle at any time, in emergency or otherwise, to instantly cut-out the electrical current to the wiring of the motor vehicle, thus eliminating any possibility of fire due to short circuiting.

Further objects of the invention are to provide, in a manner as hereinafter set forth, a safety cut out switch which is simple in its construction and arrangement, strong, durable, thoroughly efficient in its use, conveniently operated for the purpose intended, readily installed in the desired position, positive in its action, and comparatively inexpensive to manufacture.

With the foregoing and other objects in view the invention consists of the novel construction, combination and arrangement of parts as hereinafter more specifically described, and illustrated in the accompanying drawing wherein is shown an embodiment of the invention, but it is to be understood that changes, variations and modifications can be resorted to which fall within the scope of the claims hereunto appended.

In the drawing wherein like reference characters denote corresponding parts throughout the several views:—

Figure 2:
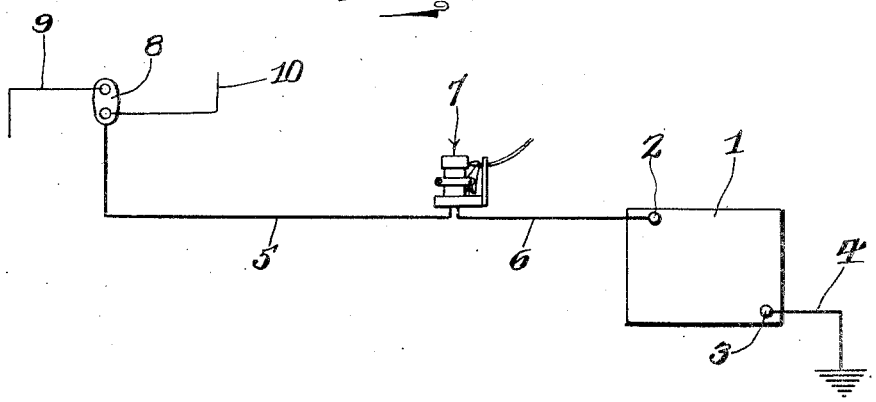
Figure 2 is a diagrammatic view illustrating the installation of the cutout in the starting and ignition system of a motor vehicle.

A safety cutout, in accordance with this invention is independent of the starting switch of a motor vehicle and is so shown. The normal position of the cutout is that for closing the sections of a positive lead from an electrical storage source, such as a battery. In Figure 2 of the drawing a battery is indicated at 1, its positive pole at 2, its negative pole at 3, and leading from the latter is a ground circuit connection 4. Extending from the positive pole 2 is the positive lead, cable or conductor formed of two sections 5, 6 which are normally electrically connected together by the cutout referred to generally at 7. The section 6 is coupled with the pole 2 and the section 5 is attached to a starting switch 8 of a motor vehicle and extending from switch 8 are the usual circuit connections 9, 10. Although the cutout 7 is shown interposed in the positive lead on the battery 1, yet it is to be understood that it can be installed in the negative lead if desired. Preferably the cutout 7 will be arranged in close proximity to the battery 1.

The cutout 7 includes a base 11 of nonconducting material having a central opening 12 in which is secured a pair of opposed, spaced, oppositely disposed, resilient contacts 13, 14 to which respectively are permanently electrically connected sections 5, 6 of the positive lead. Secured within the upper portion of the opening 12 and spaced a substantial distance above the contacts 13, 14 is a vertically disposed stem 15 formed of nonconducting material.

The upper part of the stem 15 is formed with a recess 16 which opens at the top of the stem and the latter is further formed in its lower portion with a recess 17 which opens at the lower end of the stem. The recess 16 is of greater diameter than the recess 17 and also of greater depth. The recesses 16 and 17 are connected by a channel 18 which is disposed at the axis of stem 15 and said channel 18 opens into the recesses 16, 17 centrally of the inner walls thereof. The channel 18 is of a diameter less than the diameter of either of the recesses. The stem 15 in proximity to its upper end is formed with a peripheral notch 19. The purpose of the notch 19 will be presently referred to.

Slidably mounted on the upper end of the stem 15 is a cap 20 of non-conducting material having its body portion formed with an opening 21 for a purpose to be presently referred to. Slidably mounted in the stem 15 and carried by the head 20 is a spring controlled switch member 22 of the plunger type and which includes a stem 23 having its lower end terminating in a head 24 of greater diameter than stem 23. Secured to the lower end of head 24 by the holdfast devices 25 and positioned in recess 12, to abut the contacts 13, 14 is a resilient circuit closer 25' for the purpose of closing the positive lead from the battery 1. The circuit closer 25' is of the laminated type and of arcuate contour. The switch member 22 is formed of conducting material and the diameter of the stem 23 is such as to snugly engage the diameter of the walls of the channel 18. The diameter of the head 24 is such as to slidably engage the wall of the recess 17 and also abut the shoulder 17' to arrest its upward movement.

Mounted in the recess 16 and surrounding the stem 23, as well as abutting against the inner face of the top of the cap 20 is a controlling spring 26 for the switch member 22. The function of the spring 26 is normally to maintain the cap 20 in extended position whereby the switch member 22 will have its tapered lower end 25 clear of the contacts 13, 14. The upward movement of the switch member 22 is arrested by the inner wall 27 of the recess 17. When the cap member 20 is depressed to provide for the switch member 22 to engage the contacts 13, 14 the opening 21 registers with the notch 19 formed in the periphery of the stem 15.

Connected at its lower end to one side of the base 11 is a vertical support 27 carrying a right angularly disposed bracket 28 which extends toward and beyond the stem 15 and is clamped to the latter by the bolts 29, 30 carrying nuts 31, 32 respectively. The bracket 28 is positioned below the notch 19. The support 27 near its upper end is apertured as at 33, for the purpose of connecting therewith a coupling piece 35 carried on one end of a flexible tubing 36 through which passes a pull wire 37. The tubing 36 is preferably connected to the instrument board 38 of the vehicle and the pull wire 37 projects a substantial distance from the board 38 and is provided with a handle piece 39, so that it can be conveniently reached and operated by the driver of the vehicle when desired.

Figure 1:
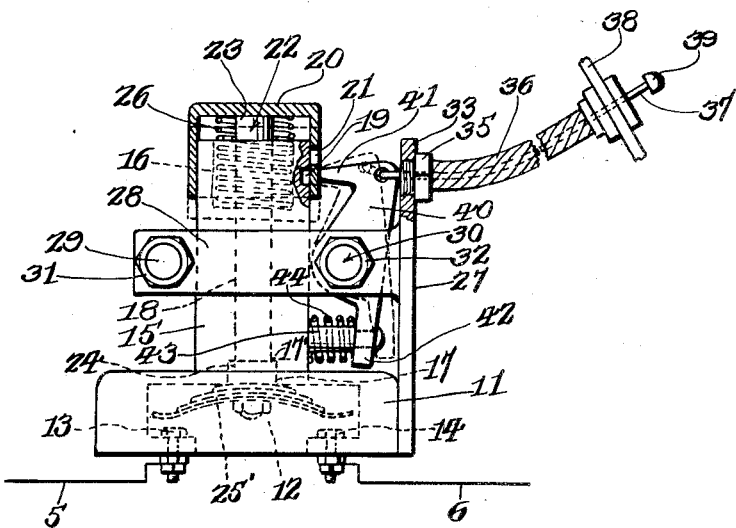
Figure 1 is a side elevation partly in section of a safety cutout switch in accordance with this invention, illustrating in full lines the device in cutout position and in dotted lines in latched position and connecting the sections of a circuit conductor leading from the positive pole of an electrical storage source such as a battery.

Pivotally mounted on the bolt 30 is a spring controlled dog 40 provided at its upper end with a nose 41 and at its lower end with a depending extension 42. Fixedly secured to the extension 42 and extending toward the stem 15 is a lug 43 adapted to abut the stem 15 and has mounted thereon a coiled controlling spring 44. The spring 44 is interposed between the stem 15 and extension 42 and normally tends to maintain the nose 41 against the cap 20. When the cap 20 is shifted downwardly the opening 21 registers with the notch 19, and on such registration the nose 41 passes through opening 21, engages in notch 19 and latches the cap 20 in its downward position, whereby the switch member 22 will be held in engagement with the contacts 13, 14 and closing the positive lead for the battery. When the cap 20 is latched the switch member 22 is secured in position with respect to the contacts 13, 14 to close the circuit from the battery to the wiring of the car. In case of short circuit, which may cause fire in the car, the electrical current can be quickly cut off by pulling the wire 37 outwardly, which carries the dog therewith and releases cap 20, whereby spring 26 will immediately act to shift head 24 of the switch member 22 out of electrical engagement with the contacts 13, 14, under such conditions the electrical current is instantly cut out from the wiring of the motor vehicle, thus eliminating the possibility of fire. The current is cut off until the cap 20 and dog 40 are shifted to the dotted line position shown in Figure 1 whereby the switch member 22 will be latched in electrical engagement with the contacts 13, 14.

It is thought the many advantages of a safety cutout, in accordance with this invention and for the purpose set forth can be readily understood, and although the preferred embodiment of the invention is as illustrated and described, yet it is to be understood that changes in the details of construction can be had which fall within the scope of the invention as claimed.

What I claim is:—

1. In a latching device for a safety cutout switch of that type including a base, a notched stationary member carried by the base and a spring controlled apertured movable member having its aperture adapted to register with the notch in the former, the combination of an upstanding support arranged in opposed spaced relation to said members, adapted to be secured at its lower end to said base and having an opening near its top, a bracket extended from the support at right angles to the latter to oppose and extend across one side of said stationary member, means carried by the bracket for securing it to said stationary member, a spring controlled vertically movable dog pivotally supported intermediate its ends from said bracket between said support and said members and having a nose at its upper end for extension into the registering notch and aperture for normally latching said movable member to said stationary member, and a pull element extending through said opening and attached to said dog.

2. In a latching device for a safety cut-out switch of that type including a base, a notched stationary member carried by the base and a spring controlled apertured movable member and with the latter having its aperture adapted to register with the notch in the former, the combination of an upstanding support arranged in opposed spaced relation to said members, adapted to be secured at its lower end to said base and having an opening near its top, a bracket extended from the support at right angles to the latter to oppose and extend across one side of said stationary member, means carried by the bracket for securing it to said stationary member, a spring controlled vertically movable dog pivotally supported intermediate its ends from said bracket between said support and said members and having a nose at its upper end for extension into the registering notch and aperture for normally latching said movable member to said stationary member, a pull element extending through said opening and attached to said dog, and means carried by and disposed at right angles to the lower end of the dog and adapted to abut said stationary member for arresting the shifting movement of the dog in one direction.

3. In a latching device, a vertical support adapted to be secured to a structure carrying the object to be latched and having an opening, a bracket projecting from said support for extension across a part of such structure, means for securing said bracket to such structure, a spring controlled dog pivotally mounted intermediate its ends on said means between the support and structure and having a nose for extension into said structure to latch the latter to the support, said dog including a depending portion carrying laterally extending means for arresting the shifting movement of the dog in one direction, the controlling spring for the dog being mounted on said laterally extending means, and a pull element connected to the upper end of said dog and extending through said opening.

In testimony whereof, I affix my signature hereto.

CARL E. DEITSCH.